(12) United States Patent
Standard (10) Patent No.: US 10,294,089 B2
(45) Date of Patent: May 21, 2019

(54) SYSTEMS AND METHODS FOR A MATERIAL HANDLING VEHICLE WITH A FLOOR SUSPENSION

(71) Applicant: The Raymond Corporation, Greene, NY (US)

(72) Inventor: Adam Wayne Standard, Johnson City, NY (US)

(73) Assignee: The Raymond Corporation, Greene, NY (US)

( * ) Notice: Subject to any disclaimer, the term of this patent is extended or adjusted under 35 U.S.C. 154(b) by 233 days.

(21) Appl. No.: 15/365,110

(22) Filed: Nov. 30, 2016

(65) Prior Publication Data
US 2017/0158474 A1    Jun. 8, 2017

Related U.S. Application Data

(60) Provisional application No. 62/262,461, filed on Dec. 3, 2015.

(51) Int. Cl.
*B66F 9/075* (2006.01)
*B66F 9/065* (2006.01)

(52) U.S. Cl.
CPC ......... *B66F 9/07531* (2013.01); *B66F 9/065* (2013.01); *B66F 9/0759* (2013.01); *B60G 2300/022* (2013.01)

(58) Field of Classification Search
CPC ........ B66F 9/07531; B66F 9/065; B66F 9/07; B66F 9/0759; B60G 2300/022; B62D 51/02
See application file for complete search history.

(56) References Cited

U.S. PATENT DOCUMENTS

| | | |
|---|---|---|
| 3,439,927 A | 4/1969 | Ryskamp |
| 5,253,853 A | 10/1993 | Conaway et al. |
| 5,579,859 A | 12/1996 | Quellhorst et al. |
| 5,845,896 A | 12/1998 | Riad |

(Continued)

FOREIGN PATENT DOCUMENTS

| | | |
|---|---|---|
| CN | 102825990 B | 5/2015 |
| EP | 0705724 A2 | 10/1996 |

(Continued)

OTHER PUBLICATIONS

Extended European Search Report; Appln. No. 16201863.4-1755; dated Sep. 2, 2017; 6 pages.

*Primary Examiner* — Brian L Swenson
(74) *Attorney, Agent, or Firm* — Quarles & Brady LLP (57) ABSTRACT

A floor suspension system for a material handling vehicle is provided. The floor suspension system includes one or more coupling assemblies to couple a battery compartment and an operator compartment of the material handling vehicle to a fork frame of the material handling vehicle. The one or more coupling assemblies each include a first pivot arm to pivotally couple the battery compartment to the fork frame, a second pivot arm to pivotally couple the operator compartment to the fork frame, and a coupling arm to couple the first pivot arm to the second pivot arm. The floor suspension system further includes a spring assembly having a spring pack pivotally coupled to the fork frame and the battery compartment.

23 Claims, 6 Drawing Sheets

(56) References Cited

U.S. PATENT DOCUMENTS

| | | | |
|---|---|---|---|
| 6,137,398 A * | 10/2000 | Dunlap | B66F 17/003 180/273 |
| 6,488,297 B2 * | 12/2002 | Murase | B60G 3/00 280/124.1 |
| 7,497,505 B2 | 3/2009 | Manci et al. | |
| 7,823,961 B2 | 11/2010 | Manci et al. | |
| 8,186,475 B2 | 5/2012 | Sugden et al. | |
| 8,414,065 B2 | 4/2013 | Jones, Jr. et al. | |
| 8,433,469 B2 * | 4/2013 | Harvey | G05D 1/0221 187/237 |
| 8,616,603 B2 | 12/2013 | Yahner | |
| 8,991,904 B2 | 3/2015 | Yahner | |
| 9,278,839 B2 * | 3/2016 | Gilbride | B62B 5/0069 |
| 9,889,894 B2 * | 2/2018 | Lohmann | B62D 51/005 |
| 2011/0260502 A1 * | 10/2011 | Yahner | B62D 33/0604 296/190.07 |
| 2014/0084616 A1 | 3/2014 | Yahner | |

FOREIGN PATENT DOCUMENTS

| | | | |
|---|---|---|---|
| EP | 1340670 | A1 | 9/2003 |
| EP | 1586531 | A1 | 10/2005 |
| JP | 7315782 | | 12/1995 |

* cited by examiner

SYSTEMS AND METHODS FOR A MATERIAL HANDLING VEHICLE WITH A FLOOR SUSPENSION

CROSS-REFERENCES TO RELATED APPLICATIONS

The present application is based on, claims priority to, and incorporates herein by reference in its entirety, U.S. Provisional Patent Application No. 62/262,461, filed on Dec. 3, 2015, and entitled "Systems and Methods for a Material Handling Vehicle with a Floor Suspension System."

STATEMENT REGARDING FEDERALLY SPONSORED RESEARCH

Not Applicable.

BACKGROUND

The present invention relates generally to material handling vehicles and, more specifically, to a floor suspension system for a material handling vehicle.

In some material handling vehicles, for example, a center riding pallet truck, an operator of the material handling vehicle stands on a floor during operation. Typically, a padded anti-fatigue floor mat and/or rubber mounts attempt to provide vibration absorption for the operator while the material handling vehicle travels over rough or uneven surfaces. However, rubber mounts are often too rigid to provide any substantial vibration absorption and, therefore, don't sufficiently isolate the floor from some vibration.

Therefore, a need exits for an improved floor design for a material handling vehicle that aids in providing enhanced vibration absorption without compromising the functional behavior of the material handling vehicle.

SUMMARY OF THE INVENTION

The above described deficiencies can be overcome by providing a material handling vehicle with a floor suspension system. The floor suspension system can isolate an operator floor from vibration, which occurs during operation of the material handling vehicle.

In one aspect, the present invention provides a floor suspension system for a material handling vehicle. The material handling vehicle includes a battery compartment receiving a battery, an operator compartment, and a fork frame from which a pair of forks extend. The floor suspension system includes one or more coupling assemblies coupling the battery compartment and the operator compartment to the fork frame. The one or more coupling assemblies each include a first pivot arm pivotally coupling the battery compartment to the fork frame, a second pivot arm pivotally coupling the operator compartment to the fork frame, and a coupling arm coupling the first pivot arm to the second pivot arm. The floor suspension system further includes one or more spring assemblies each having a spring pack pivotally coupled to the fork frame and the battery compartment.

In another aspect, the present invention provides a material handling truck including a battery compartment receiving a battery, an operator compartment, a fork frame from which a pair of forks extend, and a floor suspension system. The floor suspension system includes one or more coupling assemblies coupling the battery compartment and the operator compartment to the fork frame. The one or more coupling assemblies each include a first pivot arm pivotally coupling the battery compartment to the fork frame, a second pivot arm pivotally coupling the operator compartment to the fork frame, and a coupling arm coupling the first pivot arm to the second pivot arm. The floor suspension system further includes one or more spring assemblies each having a spring pack pivotally coupled to the fork frame and the battery compartment.

In still another aspect, the present invention provides a floor suspension system for a material handling vehicle. The material handling vehicle includes a battery compartment receiving a battery, an operator compartment, and a fork frame from which a pair of forks extend. The floor suspension system includes a first coupling assembly coupling the battery compartment and the operator compartment to a first outer surface of the fork frame, and a second coupling assembly coupling the battery compartment and the operator compartment to a second outer surface of the fork frame. The first coupling assembly and the second coupling assembly each include a first pivot arm pivotally coupling the battery compartment to the fork frame, a second pivot arm pivotally coupling the operator compartment to the fork frame, and a coupling arm coupling the first pivot arm to the second pivot arm. The suspension system further includes a spring assembly having a spring pack pivotally coupled to the fork frame and the battery compartment. The pivotal coupling of the battery compartment and the operator compartment via the first and second coupling assemblies enable the weight of the battery to counterbalance the operator compartment.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

It is also to be appreciated that material handling vehicles are designed in a variety of configurations to perform a variety of tasks. Although the material handling vehicle described herein is by example a pallet truck, it will be apparent to those of skill in the art that the present invention is not limited to vehicles of this type, and can also be provided in various other types of material handling vehicle configurations, including, for example, reach trucks, order-pickers, narrow-aisle turret trucks, and any other material handling vehicle configured to manipulate a load.

Figure 1:
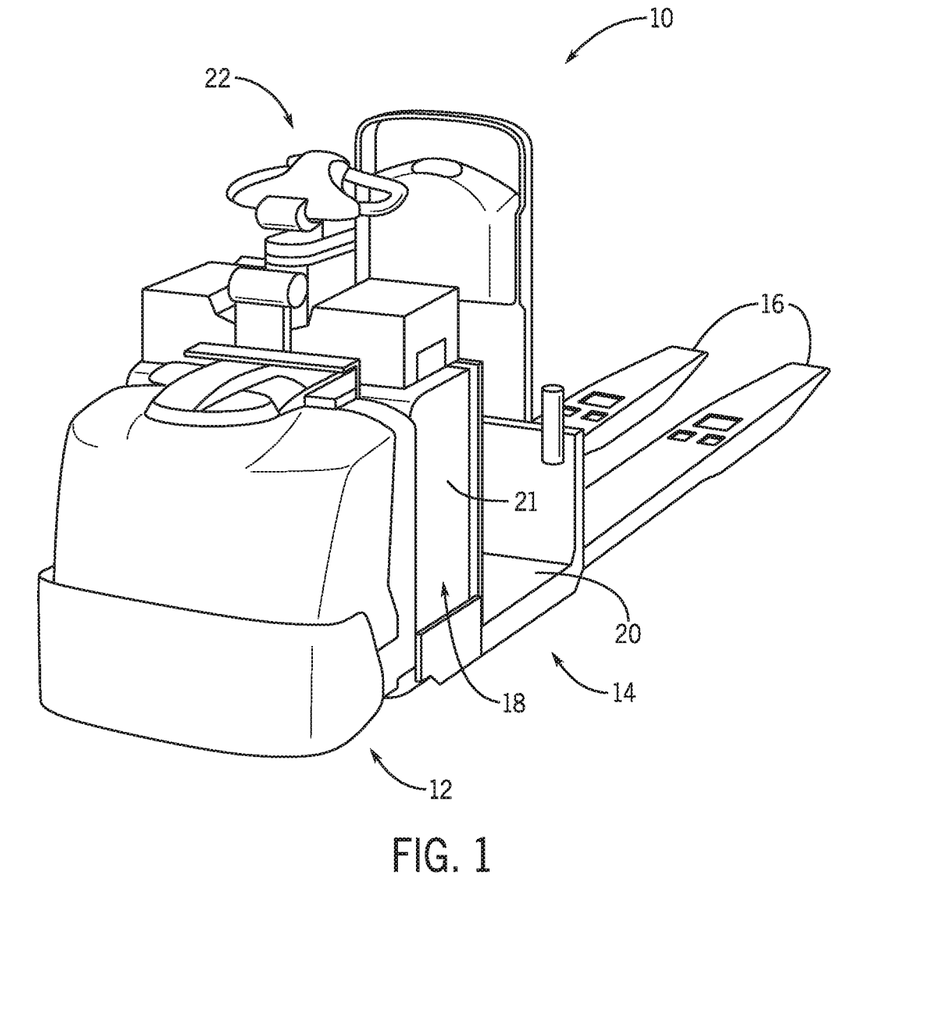
FIG. 1 is a perspective view of a material handling vehicle according to one embodiment of the present invention.

FIG. 1 illustrates a general, non-limiting, arrangement of a representative material handling vehicle 10 according to one embodiments of the present invention. The material handling vehicle 10 can include a power section 12, an operator compartment 14, and a pair of forks 16 that extend beyond the operator compartment 14. The power section 12 can include a battery compartment 18 for receiving a battery 21. As is known in the art, the power section 12 typically encloses one or more motors (not shown) that can receive power from the battery 21 and can be coupled to one or more traction wheels (not shown) for propelling and steering the material handling vehicle 10 in a desired direction.

The operator compartment 14 can include an operator floor 20 and operator controls 22. An operator of the material handling vehicle 10 can stand on the operator floor 20 (or place their feet on the operator floor 20 while sitting in the operator compartment 14) during operation of the material handling vehicle 10. The operator controls 22 can enable the operator to control the operation of the material handling vehicle 10, for example, speed and steering of the material handling vehicle 10 and height of the forks 16. In some embodiments, the operator compartment 14 may also include one or more displays for displaying operational data.

Figure 2:
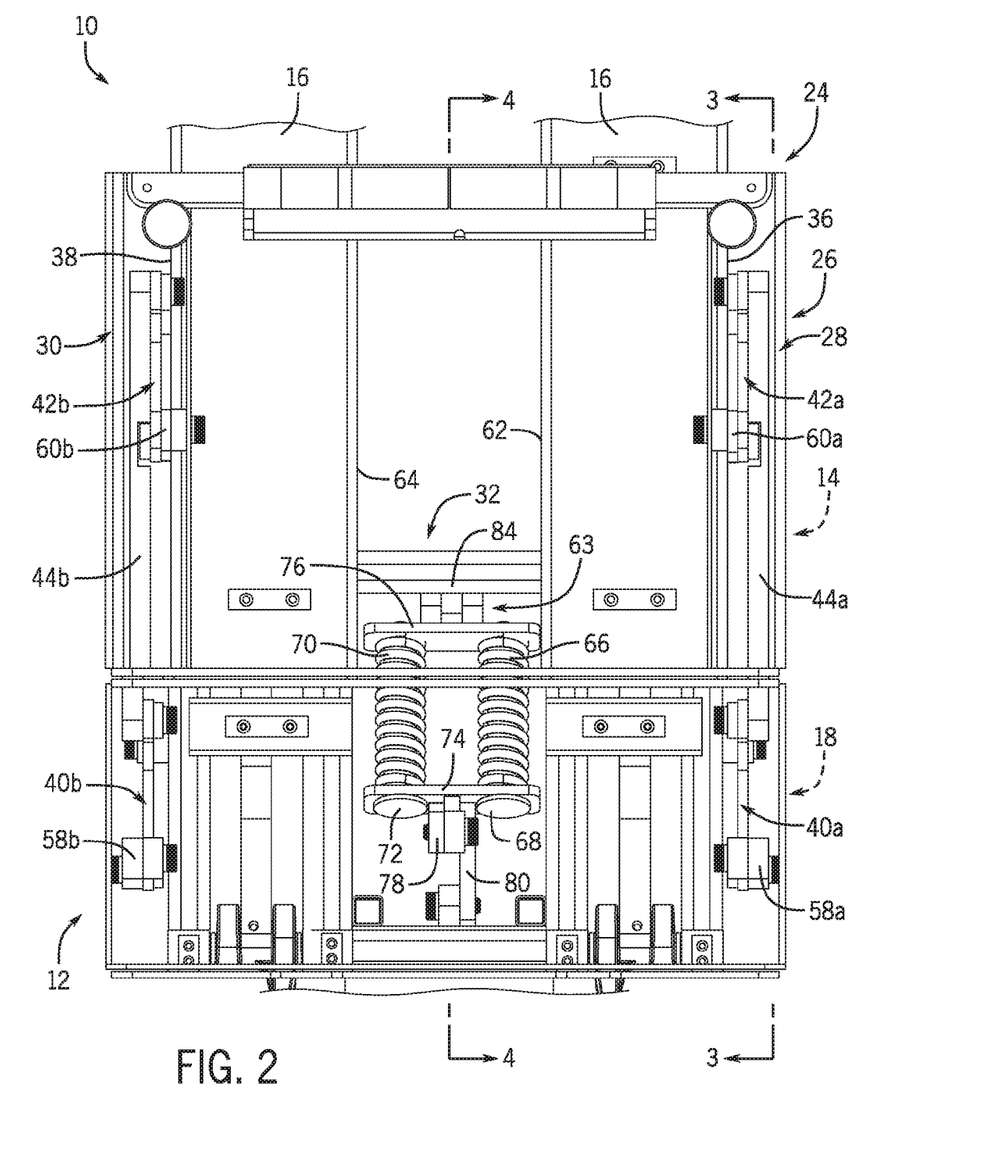
FIG. 2 is a partial top view of the material handling vehicle of FIG. 1 with an operator compartment and a battery compartment shown transparent.
Figure 3:
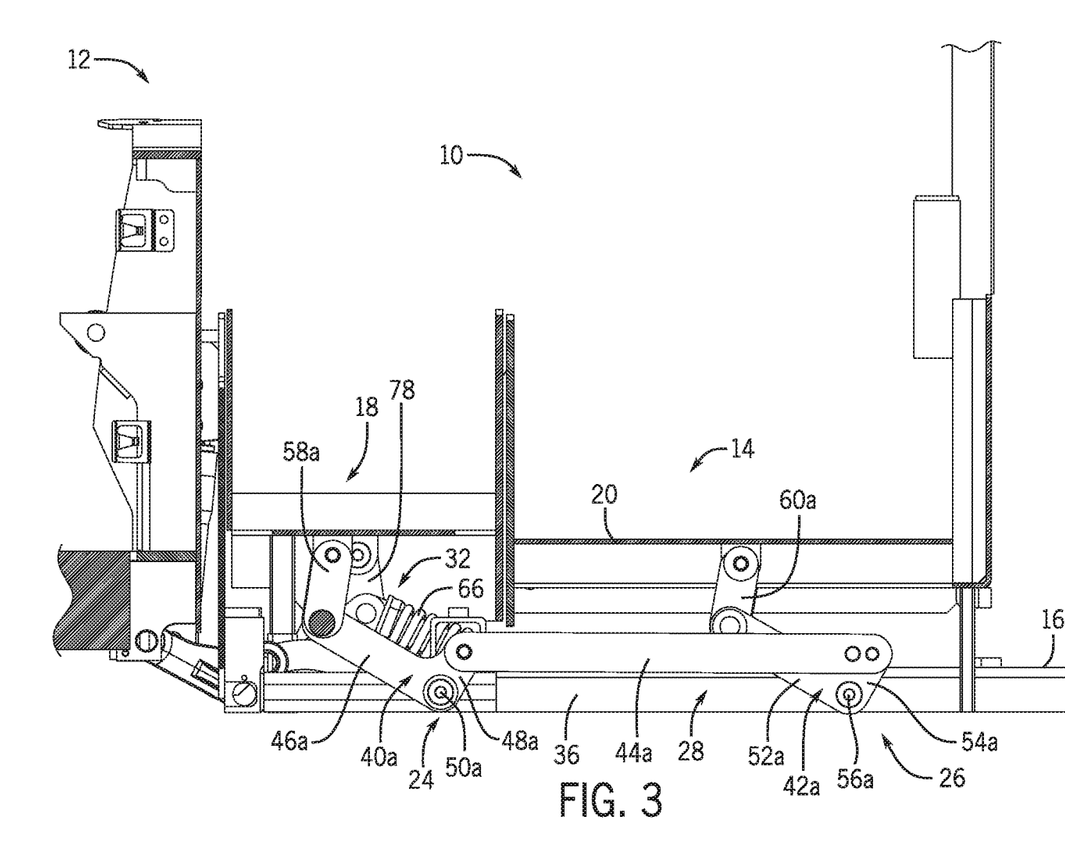
FIG. 3 is a partial cross-sectional view of the material handling vehicle of FIG. 1 taken along line 3-3.
Figure 4:
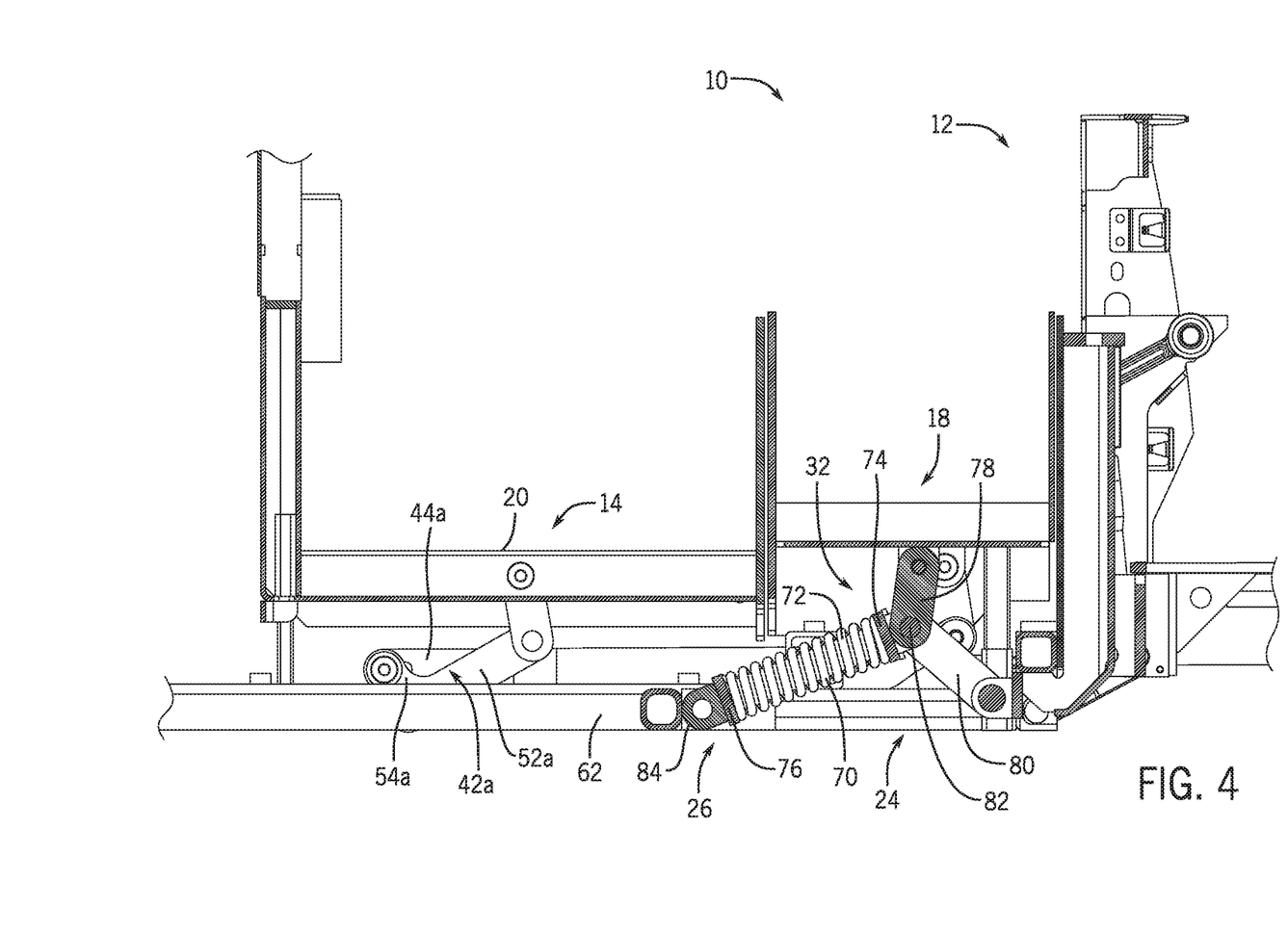
FIG. 4 is a partial cross-sectional view of the material handling vehicle of FIG. 1 taken along line 4-4.

Turing to FIGS. 2-4, the forks 16 can be integrated into a fork frame 24 of the material handling vehicle 10. The material handling vehicle 10 can include a floor suspension system 26 that can moveably couple the operator compartment 14 and the battery compartment 18 to the fork frame 24, as will be described in detail below. The floor suspension system 26 can include a first coupling assembly 28, a second coupling assembly 30, and a spring assembly 32. The first coupling assembly 28 can be coupled to a first outer surface 36 of the fork frame 24, and the second coupling assembly 30 can be coupled to a second outer surface 38 of the fork frame 24. The first coupling assembly 28 and the second coupling assembly 30 can couple together the operator compartment 14 and the battery compartment 18 such that the operator compartment 14 and the battery compartment 18 can be constrained to only displace in a vertical direction (i.e., a direction substantially perpendicular to a floor on which the material handling vehicle 10 travels).

The first coupling assembly 28 can be similar in design and functionality to the second coupling assembly 30. Therefore, the following description of the first coupling assembly 28 also applies to the second coupling assembly 30. Similar components are identified using like reference numerals with the suffix "a" applying to the first coupling assembly 28 and the suffix "b" applying to the second coupling assembly 30. The first coupling assembly 28 can include a first pivot arm 40a and a second pivot arm 42a coupled to one another via a coupling rod 44a. The first pivot arm 40a and the second pivot arm 42a can each define a substantially L-shaped profile. That is, the first pivot arm 40a can include a first long arm 46a and a first short arm 48a both extending generally perpendicularly from a first pivot point 50a, and the second pivot arm 42a can include a second long arm 52a and a second short arm 54a both extending generally perpendicularly from a second pivot point 56a. The first pivot point 50a and the second pivot point 56a can both be pivotally coupled to the first outer surface 36 of the fork frame 24.

A battery coupling arm 58a can couple a distal end of the first long arm 46a to the battery compartment 18. A compartment coupling arm 60a can couple a distal end of the second long arm 52a to the operator compartment 14. The coupling rod 44a can couple a distal end of the first short arm 48a to a distal end of the second short arm 54a, thereby linking the operator compartment 14 to the battery compartment 18. That is, the pivotal coupling and geometry of the floor suspension system 26 can enable the first coupling assembly 28 and the second coupling assembly 30 to constrain the operator compartment 14 and the battery compartment 18 to movement only in a vertical direction. Additionally, the mechanical linkage of the operator compartment 14 and the battery compartment 18 via the floor suspension system 26 can ensure that displacement of the battery compartment 18 in a vertical direction translates to the same displacement magnitude of the operator compartment 14 in the same vertical direction.

The spring assembly 32 can suspend the battery compartment 18 and thereby the operator compartment 14 via the linking of the battery compartment 18 and the operator compartment 14 by the first coupling assembly 28 and the second coupling assembly 30. The spring assembly 32 can include a spring pack 63 that is pivotally coupled to a first inner surface 62 of the fork frame 24 and to a second inner surface 64 of the fork frame 24. The spring pack 63 can include a first spring 66 arranged around a first spring rod 68 and a second spring 70 arranged around a second spring rod 72. The first and second spring rods 68 and 72 can be slidably coupled to a first spring support 74 at one end thereof and rigidly coupled to a second spring support 76 at an opposing end thereof. The first and second spring supports 74 and 76 can be arranged transverse to a longitudinal direction defined by the forks 16. The illustrated first and second spring supports 74 and 76 can be in the form of plates against which the first and second springs 66 and 70 bias against.

The first spring support 74 can be pivotally coupled to the battery compartment 18 via a spring battery coupling arm 78 and to the fork frame 24 via a spring frame coupling arm 80, which all can be coupled at a spring pivot point 82. The first spring support 74, the spring battery coupling arm 78, and the spring frame coupling arm 80 can combine to form a generally wye shaped coupling arrangement pivotal about the spring pivot point 82. The second spring support 76 can be pivotally coupled to a cross bar 84 extending between the first inner surface 62 and the second inner surface 64 of the fork frame 24. Since the first and second spring rods 68 and 72 are rigidly coupled to the second spring support 76 and slidably coupled to the first spring support 74, the first and second springs 66 and 70 can compress and expand as the operator compartment 14 and the battery compartment 18 displace in the vertical direction. In this way, the spring assembly 32 can suspend or dampen vibrations transferred to the operator compartment 14.

In one embodiment, a damper (not shown) may be integrated into the spring assembly 32 to limit vibrations experienced during displacement of the battery compartment 18 and the operator compartment 14. In still other embodiments, the floor suspension system 26 may include a torsion bar and one or more vertically mounted springs coupling the fork frame 24 to the operator compartment 14 and the battery compartment 18. In yet other embodiments, the operator compartment 14 and the battery compartment 18 may be mounted to the fork frame 24 via a plurality of suspension springs in which case the amount of vertical movement of the operator compartment 14 may be proportional to a size of the operator of the material handling vehicle 10. In some embodiments, in addition to the mechanical linkage between the operator compartment 14 and the battery compartment 18 provided by the first and second coupling assemblies 28 and 30, the battery compartment 18 and the operator compartment 14 may be attached to one another, for example, via bolting, welding, brackets, etc. This additional attachment of the operator compartment 14 to the battery compartment 18 may be arranged at a height adjacent to or above the operator floor 20. In this way, the operator compartment 14 and the battery compartment 18 may be tied together for travel as a single structure.

One non-limiting example of the operation of the material handling vehicle 10 will be described with reference to FIGS. 1-5B. During operation, a weight of the battery 21 placed in the battery compartment 18 can compress the first and second springs 66 and 70, and displace the battery compartment 18 in a first vertical direction (i.e., downwards toward a floor on which the material handling vehicle 10 travels). That is, the weight of the battery 21 can be transferred to the first spring support 74 via the spring battery coupling arm 78. The weight of the battery 21 transferred to the first spring support 74 can force the first spring support 74 to slide along the first and second spring rods 68 and 72 thereby compressing the first and second springs 66 and 70. The displacement of the battery compartment 18 in the first vertical direction can translate to the same displacement of the operator compartment 14 in the first vertical direction due to the linkage therebetween provided by the first coupling assembly 28 and the second coupling assembly 30. In this way, the battery 21 can act as a counter weight to suspend, or float, the operator compartment 14. Due to the mounting angle and geometry of the first pivot arm 40 and the second pivot arm 42, the weight of the battery 21, and a spring constant of the first and second springs 66 and 70, the suspension of the operator compartment 14 provided by the floor suspension system 26 can be independent of a weight of an operator standing on the operator compartment 14.

Figure 5A:
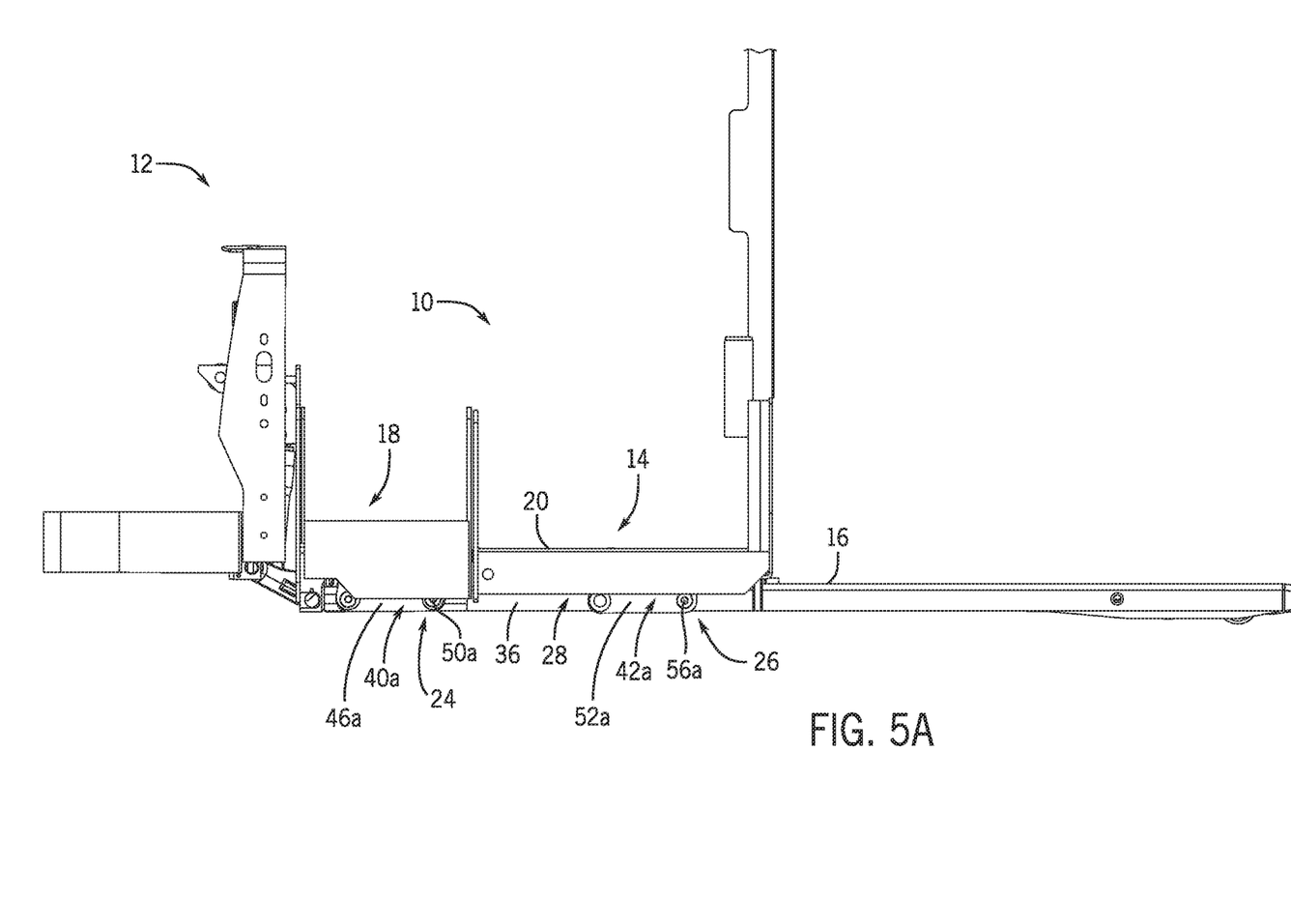
FIG. 5A is a right side view of the material handling vehicle of FIG. 1 with a floor suspension system in a first position.
Figure 5B:
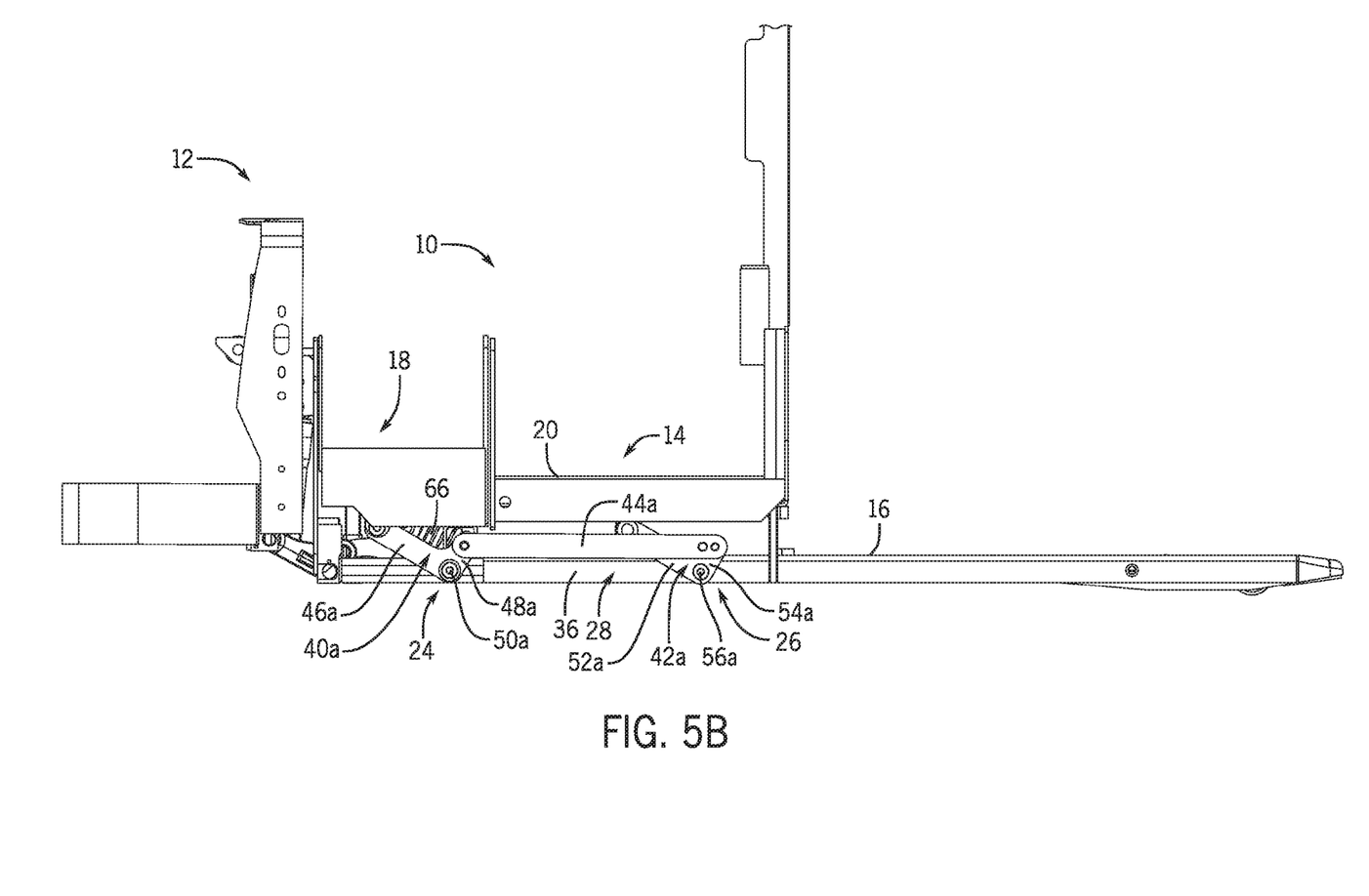
FIG. 5B is a right side view of the material handling vehicle of FIG. 1 with a floor suspension system in a second position.

As shown in FIGS. 5A and 5B, the coupling of the battery compartment 18 to the floor suspension system 26 can enable to battery compartment 18 to displace in a vertical direction (i.e., a direction substantially perpendicular to a floor on which the material handling vehicle 10 travels). Thus, when the material handling vehicle 10 travels over, for example, an uneven/rough surface, a dock plate, and/or debris, the battery compartment 18 can displace thereby compressing and unloading the first and second springs 66 and 70. Simultaneously, the operator compartment 14 can be displaced an equal amount in the same direction due to the first coupling assembly 28 and the second coupling assembly 30, thereby isolating the operator of the material handling vehicle 10 from unwanted vibrations caused by sudden changes in ride quality. This isolation provided by the floor suspension system 26 can improve a ride quality for the operator of the material handling vehicle 10 by reducing vibration when driving over, for example, uneven/rough surface, a dock plate, and/or debris. One of ordinary skill in the art would appreciate that a rebounding rate of the battery compartment 18 and the operator compartment 14 can be adjusted to provide a desired ride quality by changing a stiffness of the first and second springs 66 and 70. Alternatively or additionally, vibrations of the battery compartment 18 and the operator compartment 14 may be reduced by adding the damper, as described above. Furthermore, it should be known that the first coupling assembly 28 and the second coupling assembly 30 may utilize alternative linkage mechanisms or geometries to achieve the linking of the operator compartment 14 and the battery compartment 18, and the constraining of the operator compartment 14 and the battery compartment 18 to move only in a vertical direction.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

I claim:

1. A floor suspension system for a material handling vehicle, the material handling vehicle including a battery compartment to receive a battery, an operator compartment, and a fork frame from which a pair of forks extend, the floor suspension system comprising:

one or more coupling assemblies coupling the battery compartment and the operator compartment to the fork frame, the one or more coupling assemblies each including a first pivot arm pivotally coupling the battery compartment to the fork frame, a second pivot arm pivotally coupling the operator compartment to the fork frame, and a coupling rod coupling the first pivot arm to the second pivot arm; and a spring assembly including a spring pack pivotally coupled to the fork frame and the battery compartment.

2. The floor suspension system of claim 1, wherein the one or more coupling assemblies restrict the battery compartment and the operator compartment to movement only in a vertical direction.

3. The floor suspension system of claim 1, wherein the one or more coupling assemblies include a first coupling assembly coupled to a first outer surface of the fork frame and a second coupling assembly coupled to a second outer surface of the fork frame.

4. The floor suspension system of claim 1, wherein the first pivot arm and the second pivot arm each define a substantially L-shaped profile.

5. The floor suspension system of claim 1, wherein the spring assembly includes a first spring and a second spring biased against a first spring support and a second spring support.

6. The floor suspension system of claim 5, wherein the first spring support is pivotally coupled to the fork frame via a spring frame coupling arm and is pivotally coupled to the battery compartment via a spring battery coupling arm.

7. The floor suspension system of claim 6, wherein the first spring support, the spring battery coupling arm, and the spring frame coupling arm are all coupled at a spring pivot point.

8. The floor suspension system of claim 6, wherein the first spring support, the spring battery coupling arm, and the spring frame coupling arm combine to define a substantially wye shaped linkage.

9. The floor suspension system of claim 1, wherein the spring assembly includes a damper integrated therein.

10. The floor suspension system of claim 1, wherein when the battery compartment is displaced in a first vertical direction, the operator compartment is simultaneously displaced in the first vertical direction.

11. The floor suspension system of claim 1, wherein the one or more coupling assemblies couple the battery compartment to the operator compartment to enable the battery to counterbalance the operator compartment.

12. A material handling vehicle comprising:
a battery compartment to receive a battery;
an operator compartment;
a fork frame from which a pair of forks extend; and
a floor suspension system including:
one or more coupling assemblies to couple the battery compartment and the operator compartment to the fork frame, the one or more coupling assemblies each including a first pivot arm to pivotally couple the battery compartment to the fork frame, a second pivot arm to pivotally couple the operator compartment to the fork frame, and a coupling rod to couple the first pivot arm to the second pivot arm, and a spring assembly including a spring pack pivotally coupled to the fork frame and the battery compartment.

13. The material handling vehicle of claim 12, wherein the one or more coupling assemblies restrict the battery compartment and the operator compartment to movement only in a vertical direction.

14. The material handling vehicle of claim 12, wherein the one or more coupling assemblies include a first coupling assembly coupled to a first outer surface of the fork frame and a second coupling assembly coupled to a second outer surface of the fork frame.

15. The material handling vehicle of claim 12, wherein the first pivot arm and the second pivot arm each define a substantially L-shaped profile.

16. The material handling vehicle of claim 12, wherein the spring assembly includes a first spring and a second spring biased against a first spring support and a second spring support.

17. The material handling vehicle of claim 16, wherein the first spring support is pivotally coupled to the fork frame via a spring frame coupling arm and is pivotally coupled to the battery compartment via a spring battery coupling arm.

18. The material handling vehicle of claim 17, wherein the first spring support, the spring battery coupling arm, and the spring frame coupling arm are coupled at a spring pivot point.

19. The material handling vehicle of claim 17, wherein the first spring support, the spring battery coupling arm, and the spring frame coupling arm combine to define a substantially wye shaped arrangement.

20. The material handling vehicle of claim 12, wherein the spring assembly includes a damper integrated therein.

21. The material handling vehicle of claim 12, wherein when the battery compartment is displaced in a first vertical direction, the operator compartment is simultaneously displaced in the first vertical direction.

22. The material handling vehicle of claim 12, wherein the one or more coupling assemblies couple the battery compartment to the operator compartment to enable the battery to counterbalance the operator compartment.

23. A floor suspension system for a material handling vehicle, the material handling vehicle including a battery compartment to receive a battery, an operator compartment, and a fork frame from which a pair of forks extend, the floor suspension system comprising:

a first coupling assembly coupling the battery compartment and the operator compartment to a first outer surface of the fork frame;

a second coupling assembly coupling the battery compartment and the operator compartment to a second outer surface of the fork frame, wherein the first coupling assembly and the second coupling assembly each include a first pivot arm pivotally coupling the battery compartment to the fork frame, a second pivot arm pivotally coupling the operator compartment to the fork frame, and a coupling rod coupling the first pivot arm to the second pivot arm; and a spring assembly including a spring pack pivotally coupled to the fork frame and the battery compartment, wherein pivotal coupling of the battery compartment and the operator compartment via the first and second coupling assemblies enable the weight of the battery to counterbalance the operator compartment.

* * * * *